297-290
SEARCH ROOM
155/164
COWLES & HULBERT.
Carriage-Seat.
No. 271.
A I Patented Mar. 13, 1860.
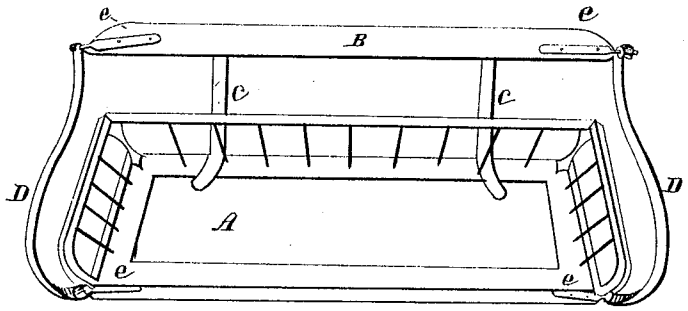
1797
Witnesses:
Wm. W. Swormstedt
E. F. Davis
Witnesses
John G. Clark
Edw. F. Brown
H. Cowles
A. Hulbert